(12) United States Patent
Yamagiwa

(10) Patent No.: US 7,142,116 B2
(45) Date of Patent: Nov. 28, 2006

(54) ARTICLE MANAGEMENT SYSTEM

(75) Inventor: Toshio Yamagiwa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 133 days.

(21) Appl. No.: 10/795,410

(22) Filed: Mar. 9, 2004

(65) Prior Publication Data
US 2004/0206810 A1 Oct. 21, 2004

(30) Foreign Application Priority Data
Mar. 19, 2003 (JP) .............................. 2003-075586
Mar. 25, 2003 (JP) .............................. 2003-083792

(51) Int. Cl.
*G08B 13/14* (2006.01)
(52) U.S. Cl. ............... 340/572.1; 340/572.7; 340/572.8; 340/539.1; 340/825.49; 340/825.72
(58) Field of Classification Search ............ 340/572.1, 340/572.7, 572.8, 539.1, 425.5, 825.49, 825.72, 340/825.69; 235/376, 435, 487, 488; 705/1, 705/5, 13
See application file for complete search history.

(56) References Cited

U.S. PATENT DOCUMENTS

| 5,745,036 A | 4/1998 | Clare |
| 6,305,548 B1 * | 10/2001 | Sato et al. .................... 209/3.3 |
| 6,362,737 B1 * | 3/2002 | Rodgers et al. .......... 340/572.1 |
| 6,417,760 B1 * | 7/2002 | Mabuchi et al. ............. 340/5.3 |
| 6,883,710 B1 * | 4/2005 | Chung ........................ 235/385 |
| 2001/0034565 A1 | 10/2001 | Leatherman |
| 2002/0125315 A1 * | 9/2002 | Ogawa |
| 2003/0182140 A1 * | 9/2003 | Furuya et al. |
| 2004/0036623 A1 * | 2/2004 | Chung |
| 2004/0088231 A1 * | 5/2004 | Davis, Jr. |

FOREIGN PATENT DOCUMENTS

| DE | 201 06 542 U1 | 6/2001 |
| EP | 0 563 713 A2 | 10/1993 |
| EP | 0 689 950 A2 | 1/1996 |
| JP | 11-133860 A | 5/1999 |
| JP | 2000-84532 A | 3/2000 |
| WO | WO-01/22377 A1 | 3/2001 |
| WO | WO-01/80146 A1 | 10/2001 |
| WO | WO-02/36368 A1 | 5/2002 |

* cited by examiner

Primary Examiner—Hung Nguyen
(74) Attorney, Agent, or Firm—Birch, Stewart, Kolasch & Birch, LLP

(57) ABSTRACT

To provide an article management system capable of managing part configuration information, registration information of owners and the like, and detailed history information related to articles and capable of utilizing the information for further various purposes. In addition, to provide an IC (RFID) capable of transmitting not only product information previously given from the outside but also information indicating the current state of a product itself.

9 Claims, 14 Drawing Sheets

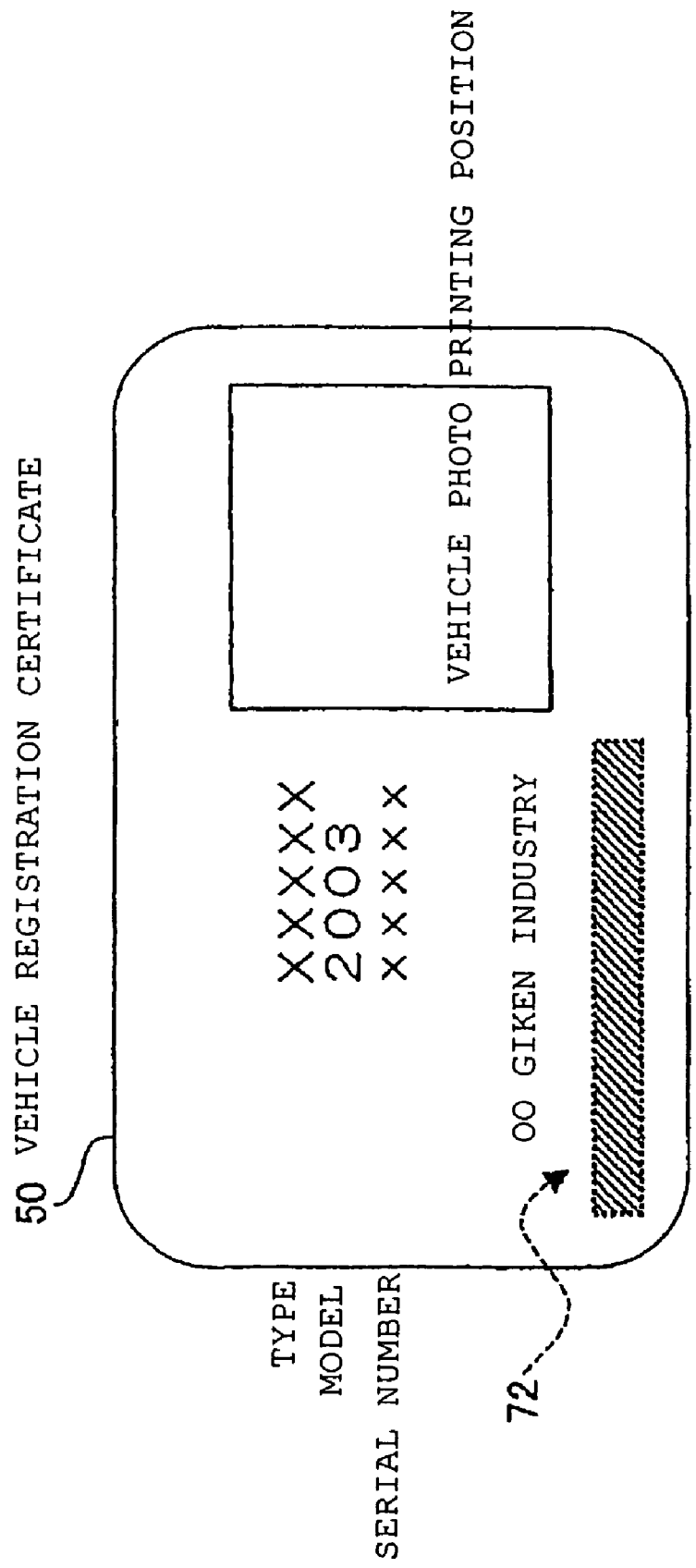

FIG. 6

VEHICLE INFORMATION DATABASE
OWNER DATA

| VEHICLE ID | OWNER | | ADDRESS |
|---|---|---|---|
| | NAME | DATE OF BIRTH | |
| | | | |
| | | | |
| | | | |
| | | | |
| | | | |
| | | | |
| | | | |
| | | | |
| | | | |
| | | | |

FIG. 8

VEHICLE INFORMATION DATABASE
VEHICLE HISTORY DATA

VEHICLE ID
DATE

| BRIEF HISTORY | DETAIL |
|---|---|
| NEW VEHICLE PRODUCTION | OO GIKEN INDUSTRY, OO PLANT |
| OWNER REGISTRATION | OWNER NAME, ADDRESS |
| FILLING | FILLING STATION, QUANTITY OF FUEL |
| FILLING | FILLING STATION, QUANTITY OF FUEL |
| FILLING | FILLING STATION, QUANTITY OF FUEL |
| REPAIR | REPAIR SHOP, REPAIR DETAIL |
| FILLING | FILLING STATION, QUANTITY OF FUEL |
| OWNER CHANGE | OWNER NAME, ADDRESS |
| . . . | |
| UNREGISTRATION | |
| MANIFEST ISSUE | |

FIG. 9

VEHICLE INFORMATION DATABASE
MANIFEST ISSUE DATA

|  |  |
|--|--|
|  |  |
|  |  |
|  |  |
|  |  |
|  |  |

| | |
|--|--|
| VEHICLE INFORMATION DATABASE | |
| MANIFEST ISSUE DATA | |
| VEHICLE ID | |
| MANIFEST ISSUED FLAG | |
| DISPOSAL TREATMENT CODE | |
| WASTE GENERATOR INFORMATION | PUBLIC KEY OF WASTE GENERATOR |
| COLLECTOR/TRANSPORTER INFORMATION | PUBLIC KEY OF COLLECTOR/TRANSPORTER |
| INTERMEDIATE TREATMENT COMPANY INFORMATION | PUBLIC KEY OF INTERMEDIATE TREATMENT COMPANY |
| FINAL DISPOSAL COMPANY INFORMATION | PUBLIC KEY OF FINAL DISPOSAL COMPANY |

ARTICLE MANAGEMENT SYSTEM

CROSS-REFERENCE TO RELATED APPLICATIONS

This nonprovisional application claims priority under 35 U.S.C. § 119(a) on Patent Application Nos. 2003-075586 and 2003-083792, filed in Japan on Mar. 19, 2003 and March 25, respectively, the entirety of which is incorporated herein by reference.

BACKGROUND OF THE INVENTION

1. Field of the Invention

The present invention relates to an article management method and system for managing articles. In particular, the present invention relates to an article management method and system for managing transportation equipment, such as automobiles, motorcycles, ships and airplanes, throughout their life cycle.

The present invention also relates to an integrated circuit (IC). In particular, the present invention relates to an IC having the function of transmitting product information including product identification information to the outside.

2. Description of Background Art

A method for managing articles by use of RFIDs (Radio Frequency IDentification) has gradually become widespread. This is a method for managing articles by use of RFIDs (also called IC tags, radio tags, electronic tags and the like) which are small-sized tags with embedded ICs (integrated circuits) and means for transmitting and receiving radio signals. Specifically, in the above-described method, the RFID is attached to the article or its packaging. Information for identifying product classification and individual products in a distribution process of the article or the like is read from the RFID. Furthermore, a computer is used to manage the system, for example, where and which products are kept in stock or the like.

In Japanese Patent Laid-Open No. 2002-169858, there is disclosed a technology of a system which enables management of an article such as a vehicle from its production to its disposal in such a manner that an RFID (tag) is kept in a fixed state from the production of the article to the disposal thereof. Information inherent in the article, which is stored in an IC in the RFID, can be read from a computer. This system includes, between the production and the disposal, information on, for example, inventory management, delivery management, distribution management, maintenance management and customer management.

In addition, in Japanese Patent Laid-Open No. 2002-169858, there has been disclosed: a technology of fixing an RFID to a chassis frame made of a steel plate (FIGS. 2 and 3, Paragraph 0007); and a technology of fixing an RFID to an electromagnetic shielding plate which performs electromagnetic shielding of an RFID antenna from the chassis frame made of a steel plate (FIG. 2, Paragraph 0009), a side of the chassis frame, a bottom of a monocoque body, or a bumper (FIG. 5, Paragraph 0020).

Furthermore, in Japanese Patent Laid-Open No. 2000-076334, there is disclosed a technology for recording data related to article recycling in an RFID (electronic tag) and placing electronic money on the RFID under the control of a recycling agent.

In addition, in Japanese Patent Laid-Open No. 2000-084532, there is disclosed a technology for distinguishing which route a waste product is to be sent according to data read from an RFID (electronic tag).

The technology described in the Japanese Patent Laid-Open No. 2002-169858 is inconvenient because, for example, information about who is a legitimate owner of an article (a vehicle or the like), information about what kind of parts are included in an individual article, detailed history information after the article is manufactured and the like cannot be managed. In addition, a storage capacity of an IC chip fixed to the article is limited. Thus, there is a problem in that a large amount of detailed information cannot be retained.

In the "abstract" of Japanese Unexamined Patent Publication No. Hei 11(1999)-133860, an IC (product tag) is described in which the product code of received product information and the product code stored in a memory are compared when the product information has been received from the outside. Then, if the product codes match, the product information in the memory is updated with the received product information. This technology makes it possible to reduce human resources for the work of replacing tags, the work of attaching seals to tags, or the like, for example, in the case where the prices of products are changed for discounts or the like, or where many product tags are simultaneously changed in a settlement period or the like.

However, in the above-described background art, product information (price information and the like) given from the outside can be stored on an IC, but the state of a product itself cannot be transmitted to the outside. To cite an example, a tire of an automobile, a motorcycle (two-wheeled motor vehicle, engine-equipped bicycle), a four-wheeled buggy, or the like needs to be exchanged or replenished with air when the air pressure becomes low. Therefore, it is preferred that information regarding the air pressure can be known on the outside.

SUMMARY OF THE INVENTION

The present invention is made to solve the above problems of the background art. It is an object of the present invention to provide an article management system which can manage part configuration information, registration information of an owner and the like, and detailed history information related to an article and can use the information for various purposes.

Another object of the present invention is to provide an IC capable of transmitting not only product information previously given from the outside but also information indicating the current state of a product itself.

In order to solve the above-described problems, the present invention is directed to an article management system including: tag information read means for reading information from a tag fixed to an article from production of the article to disposal thereof; identification means for identifying the individual article based on information read from the tag; article information storage means for storing at least one of registration information and history information of the article while associating the information with identification information of the individual article; and information output means for reading at least any one of the registration information related to the individual article and the history information related thereto from the article information storage means and outputting the read information, based on an identification result obtained by the identification means.

According to the configuration described above, the tag information read means connected to a terminal device, for example, reads information including article identification information from the tag. The identification means can identify an individual article to which the tag is fixed by retrieving the article identification information from the information read from the tag. In addition, the article information storage means (which is realized by a vehicle information database in a computer server, a memory in an RFID or the like) for storing at least any one of registration information of the article (vehicle registration information of a vehicle, information such as name, address and e-mail address of an owner and the like) and history information thereof (such as manufacture, registration, owner transfer, fueling, maintenance, inspection, repair, part replacement, export/import and registration deletion) while associating the information with the article identification information. Based on an identification result obtained by the identification means, that is, the article identification information, registration information related to the individual article or history information related thereto is outputted. Thus, the outputted information can be confirmed by a person.

Additionally, in the present invention, the article management system includes the article information storage means provided outside of the tag.

According to the configuration described above, the article information storage means is provided outside of the tag (for example, in a magnetic disk device or the like which is included in a computer system). Thus, a larger amount of information can be stored.

Additionally, in the present invention, the article management system includes the article as transportation equipment.

The transportation equipment includes vehicles (a car, a bus, a truck, a motorcycle, a motorized bicycle, a bicycle, a four-wheel buggy and the like), airplanes, ships, boats, yachts, marine bikes and the like.

Additionally, in the present invention, the article management system includes a terminal device provided in each base, which includes the tag information read means. The system further includes: search target identification information storage means for storing identification information of transportation equipment to be searched; and comparison means for comparing an identification result obtained by identifying an individual transportation equipment by the identification means to identification information stored in the search target identification information storage means, based on information sent from the terminal device.

According to the configuration described above, the terminal device including the tag information read means is provided in each base such as a gas station and a repair plant. Meanwhile, in searching a stolen car or the like, identification information (vehicle ID) of transportation equipment, which is stored in a tag printed on or implanted in a vehicle registration certificate or the like is previously stored in the search target identification information storage means. The terminal device in the base reads information of the tag fixed to the transportation equipment from all transportation equipment to be fueled or repaired. All of the read information of the tag is transmitted to a device including the identification means. The comparison means compares the identification result obtained by the identification means to identification information stored in the search target identification information storage means. Accordingly, if both coincide with each other, the comparison means can detect a searched vehicle such as a stolen car. In addition, the terminal device which has read the tag information of the vehicle is specified. Thus, positional information of the vehicle can be also obtained.

Additionally, in the present invention, the article management system further includes: part configuration information storage means for storing part configuration information indicating a part configuration for each individual article while associating the part configuration information with identification information of the article; owner information storage means for storing owner information indicating an owner for each individual article while associating the owner information with the identification information of the article; and owner information extraction means for listing article identification information of an article including a specific part by referring to the part configuration information storage means and for extracting and outputting the owner information stored in the owner information storage means while associating the owner information with the listed article identification information, respectively.

According to the configuration described above, in order to extract an owner of an article including a specific part, based on information which specifies a part (for example, a model number of a part, a lot number thereof and the like), information written into the part configuration information storage means is searched and a list of article identification information (vehicle ID) of the relevant article is temporarily written into a storage device (a semiconductor memory or the like). In addition, as to respective articles included in the written article identification information list, owner information (name, address, e-mail address and the like) can be extracted from the owner information storage means. Thus, guidance of part replacement, guidance of update of software built into a part and the like can be completely sent.

Additionally, in the present invention, the article management system further includes: manifest issuance means for issuing a manifest in association with identification information for identifying the individual article; and waste disposal information storage means for storing information of enterprises in respective stages of waste disposal in association with the identification information.

According to the configuration described above, the manifest can be issued while being associated with the identification information stored in the tag fixed to the article. In addition, information of enterprises in respective stages of waste disposal can be stored in the waste disposal information storage means while being associated with the identification information. Thus, management of waste can be performed more strictly.

Additionally, in the present invention, the article management system includes a portable terminal device for reading information from the tag fixed to a dumped article, which includes the tag information read means, the identification means identifies the dumped individual article based on information sent from the portable terminal device and the system further comprises dumped article information output means for outputting information read by referring to at least any one of the article information storage means and the waste disposal information storage means based on an identification result obtained by the identification means.

According to the configuration described above, when an article is illegally dumped, the tag information read means included in the portable terminal device reads tag information from the tag fixed to the article. This information is transmitted to a device including the identification means from the portable terminal device. The identification means identifies an individual article based on the information transmitted from the portable terminal device and obtains individual article identification information. Based on this identification information, registration information included in the article information storage means (information such as name and address of an owner) and waste disposal information included in the waste disposal information storage means (information indicating which stage of processing is performed by which enterprise) can be outputted by referring to at least any one of the article information storage means and the waste disposal information storage means. Thus, it is possible to give a person a clue to specifying who has illegally dumped the article.

The present invention is also directed to an IC, which includes storage means for storing product information including product identification information and control means for reading out the product information from the storage means and transmitting the information to the outside, wherein a sensor is provided inside.

Such a configuration allows the sensor to sense the state of a product. Therefore, the sensed state of the product can be transmitted to the outside.

In addition, in the present invention in the IC, the control means writes product information to the storage means upon receiving the product information from the outside.

According to such a configuration, the product information in the IC can be updated by transmitting product information from the outside to the IC.

Furthermore, the present invention includes the sensor as a pressure sensor or temperature sensor. Each of these configurations makes it possible to sense the state of pressure or temperature related to the product.

Furthermore, the present invention includes the storage means, the control means, and the sensor being contained in a single case.

In addition, the present invention is directed to the aforementioned IC, in which a circuit supplied with power from a battery includes a sensor, storage means for storing product identification information, and control means, and the control means transmits the product identification information read out from the storage means to the outside and transmits information sensed by the sensor to the outside. Meanwhile, the IC includes a circuit (RFID) which is supplied with power from a power source (accumulation means) independent of the battery includes storage means for storing product identification information and second control means, wherein the second control means transmits the product identification information read out from the storage means to the outside.

This configuration enables the second control means to transmit the product identification information to the outside even in the state where there is no supply of power from the battery.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a schematic view showing one example of a face of a vehicle registration certificate according to the first embodiment;

FIG. 6 is a schematic view showing a data structure of owner data included in a vehicle information database according to the first embodiment;

FIG. 8 is a schematic view showing a data structure of vehicle history data included in the vehicle information database according to the first embodiment;

FIG. 9 is a schematic view showing manifest issuance data included in the vehicle information database according to the first embodiment;

DETAILED DESCRIPTION OF THE PREFERRED EMBODIMENTS

Figure 1:
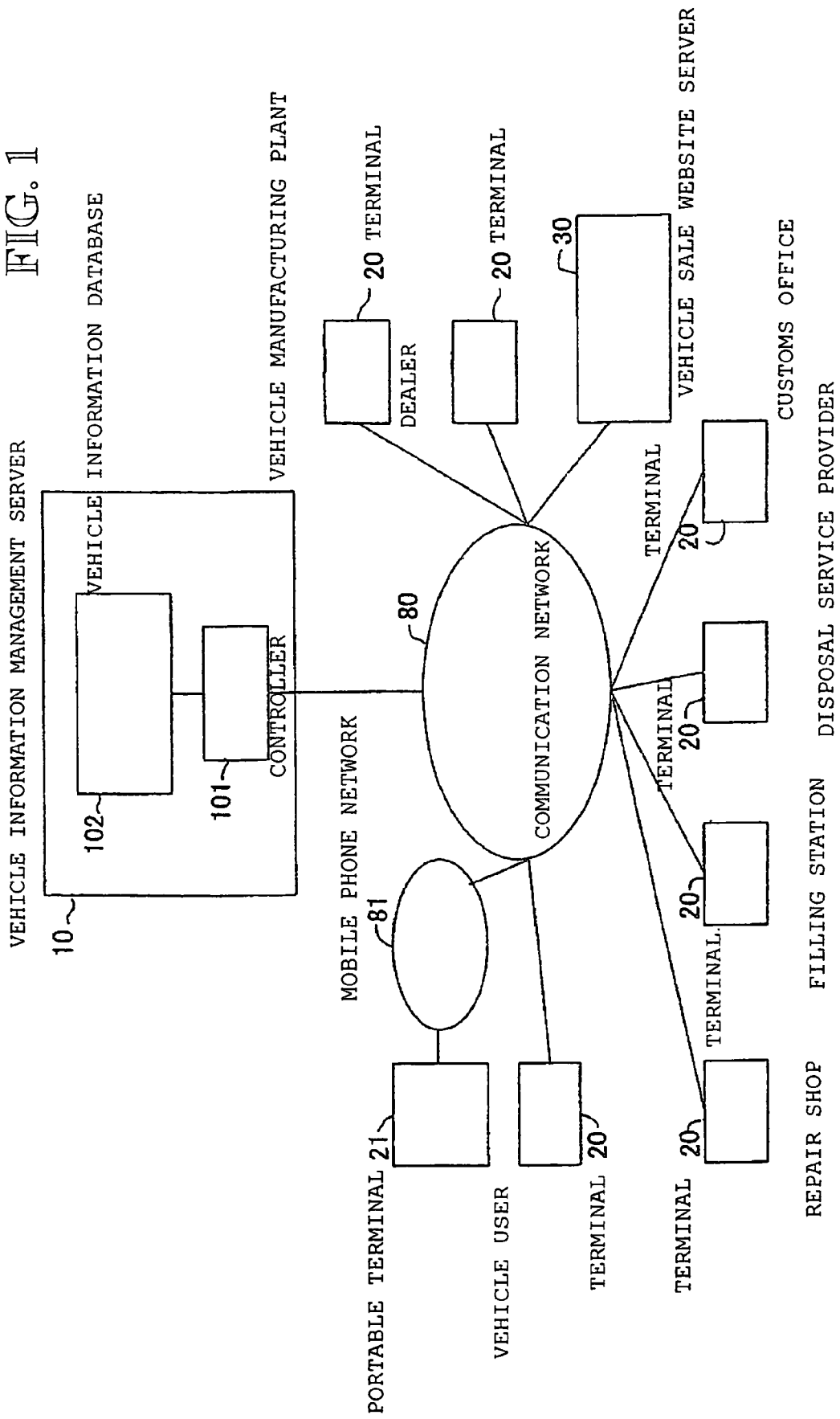
FIG. 1 is a block diagram showing a configuration of a vehicle management system according to a first embodiment of the present invention.

The present invention will now be described with reference to the accompanying drawing, wherein the same of similar elements are identified with the same reference numerals throughout the several views.

FIG. 1 is a block diagram showing a configuration of a vehicle management system according to the first embodiment. In FIG. 1, reference numeral 10 is a vehicle information management server and this vehicle information management server 10 includes: a control unit 101 (identification means, information output means, search target identification information storage means, comparison means, owner information extraction means, manifest issuance means and dumped article information output means) and a vehicle information database 102 (article information storage means, part configuration information storage means, owner information storage means and waste disposal information storage means). In addition, reference numerals 20 are terminals provided, respectively, in a car manufacturing facility, a car dealer, a car repair plant, a gas station, a car waste disposer, customs office, a vehicle user's house and the like. It should be noted that according to need, an RFID reader/writer (tag information read means) is connected to each of the terminals 20. Thus, it is made possible to read and write information from a memory in an RFID provided in a vehicle or in an RFID implanted in a vehicle registration certificate. Note that the waste disposer includes: a discharge enterprise which discharges waste; a collector/transporter which collects/transports discharged waste; an intermediate disposal enterprise which performs intermediate disposal of waste; a final disposal enterprise which performs final disposal after the intermediate disposal; and the like. Reference numeral 21 is a portable terminal, which is carried by a vehicle user, for example. In addition, reference numeral 30 is a server of a vehicle sales website provided for selling vehicles by use of a so-called web interface via a communication network.

Reference numeral 80 is a communication network, through which the vehicle information management server 10, the terminals 20, the portable terminal 21 and the vehicle sales website server 30 can communicate with each other. Note that the portable terminal 21 can be connected to the communication network 80 via a mobile telephone network 81. Here, the mobile telephone network 81 and the communication network 80 are connected to each other via an unillustrated gateway device and the like.

In the vehicle information management server 10, the vehicle information database 102 retains management information related to each vehicle throughout its entire life cycle from a stage of shipping the vehicle from a factory to a stage of subjecting the vehicle to waste disposal. In addition, as described later, the control unit 101 refers to data stored in the vehicle information database 102 and writes data into the vehicle information database 102 while exchanging data with the terminals 20, the portable terminal 21, the vehicle sales website server 30 and the like.

Note that the vehicle information management server 10, the terminals 20 and the vehicle sales website server 30 are realized by use of a computer. In addition, as the portable terminal 21, a portable telephone terminal (a mobile telephone terminal or a PHS (trademark, Personal Handyphone System) terminal), a PDA (Personal Digital Assistant) or the like is used. Each of the devices described above includes a CPU (central processing unit) therein. Here, stages of processing performed by the respective devices are stored in a computer-readable recording medium in a form of a computer program. Accordingly, this program is read and executed by the CPU and the foregoing processing is performed. Here, the computer-readable recording medium means a magnetic disk, a magneto-optical disk, a CD-ROM, a DVD-ROM, a semiconductor memory or the like. In addition, this computer program may be delivered to a computer through a communication line and a CPU provided in the computer, which has received this delivery, may execute the program.

A description will now be provided of means for identifying vehicles individually in the system of the present invention. An RFID is provided in a vehicle, which can be identified by use of a vehicle ID. A semiconductor memory is built into the RFID 72. In this semiconductor memory, both of a rewrite-inhibited area and a rewritable area exist. In this rewrite-inhibited area, at least a vehicle ID for identifying a vehicle is previously written.

Figure 2:
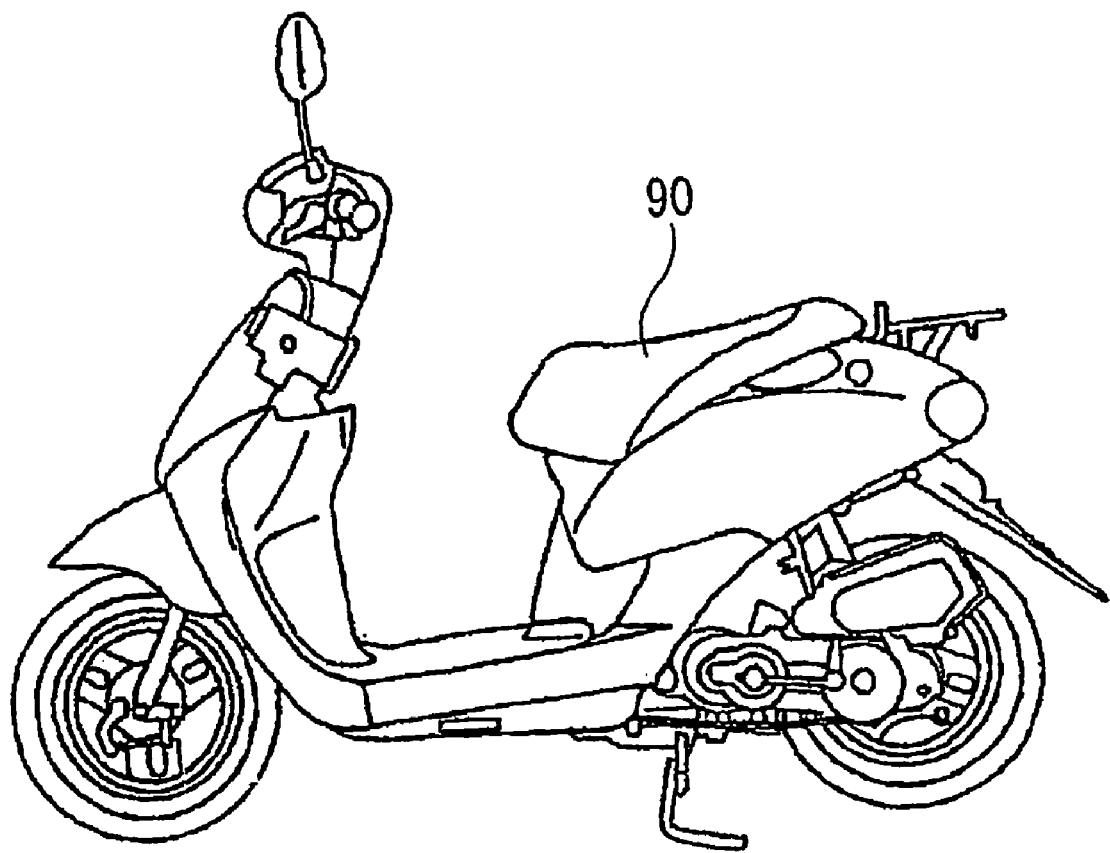
FIG. 2 is a schematic view showing positions of a vehicle (motorcycle) where an RFID is attached according to the first embodiment.

FIG. 2 is a schematic view showing an outline of a location for attaching the RFID when the vehicle is a motorcycle. In FIG. 2, reference numeral 90 is a seat on which a person sits, and this seat is made of a resin member. Here, it is assumed that the above-described RFID is provided in this seat.

Figure 3A:
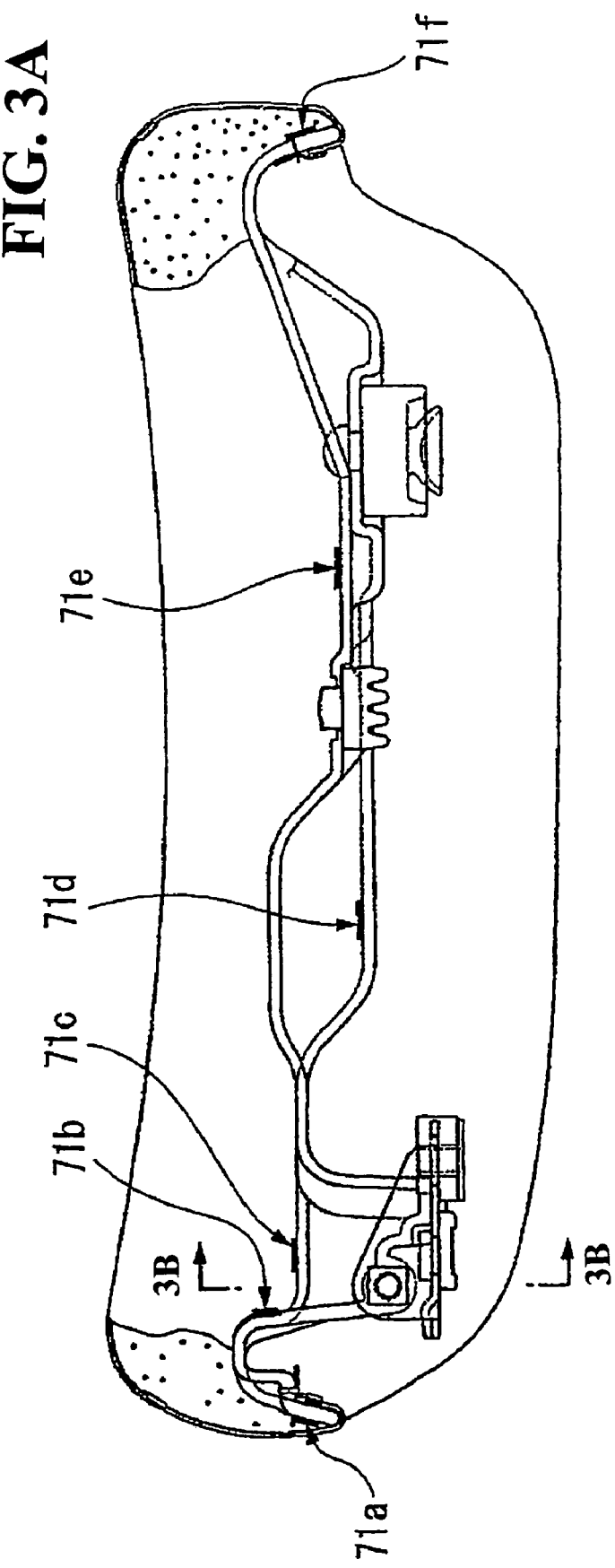
FIGS. 3A and 3B are cross-sectional views of a seat, showing a position to attach the RFID in more detail according to the first embodiment.
Figure 3B:
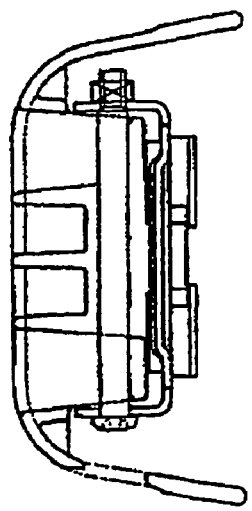

FIG. 3A is a cross-sectional view of the seat along its longitudinal direction. In FIG. 3A, reference numerals 71*a* to 71*f* are examples of a position to fix the RFID, individually. The RFID may be attached to any of 71*a* to 71*f*. However, particularly, when the RFID is attached to the position of 71*a* or 71*f*, an RFID reader/writer can be brought closer to the RFID since a distance from a seat surface to the RFID is short. Note that FIG. 3B is a cross-sectional view of the seat along the lines 3B—3B of FIG. 3A.

It should be noted that as shown in FIG. 3A, the resin member, which forms the seat, has a certain thickness in a vertical direction to function as a cushion for a rider. Therefore, when the RFID is attached at 71*b*, 71*c*, 71*d* or 71*e*, the distance to the seat surface becomes relatively long. Meanwhile, when the RFID is attached to a front portion or a rear portion in the seat, such as 71*a* or 71*f*, the distance from the front or rear portion to the seat surface becomes relatively short. Therefore, if an arrival distance of a read/write signal (electromagnetic waves) of the RFID is relatively short, by providing the RFID in the position, such as 71*a* or 71*f*, where the distance to the seat surface is relatively short, the reader can be brought closer to the RFID and read/write can be facilitated.

Note that although FIGS. 2 and 3 show the position to attach the RFID in the case of a motorcycle (similarly, a motorized bicycle), it is also possible to provide the RFID in a seat of a saddle-riding type vehicle such as a bicycle, a personal water craft (PWC) and a four-wheel buggy. Since the seat is made of a resin member through which electromagnetic waves are transmitted, it is advantageous to attach the RFID to the inside of the seat as described above in order to read and write stored information of the RFID by use of electromagnetic wave signals. In addition, usually, the saddle-riding type vehicle has no metal roof or the like to cover an upper side of the seat. Thus, for example, it is also possible to place the RFID reader/writer above a vehicle stopping position or the like at a gas station, at a repair plant, in the road and the like, which is advantageous. In addition, the RFID is fixed to the vehicle from its production to its disposal. Accordingly, by providing the RFID in the seat, there is an advantage that the RFID is not easily detached therefrom.

It should be noted that in the case of a car having a metal roof or a vehicle such as a bus and a truck, the RFID is attached to the inside of the seat and a handheld reader/writer is carried into the vehicle. Accordingly, information of the RFID is read and written. Alternatively, the RFID is attached to the vicinity of a front window or a rear window of the car. For example, the RFID may be attached to a dashboard part and the RFID may be read and written from above outside of the vehicle. In addition, the RFID may be also attached in a resin member, which forms the dashboard part.

A description will now be given of a vehicle registration certificate used in the system of the present invention. FIG. 4 is a schematic view showing one example of a face of the vehicle registration certificate. In FIG. 4, the vehicle registration certificate 50 is a certificate issued for each vehicle. As shown in FIG. 4, on a surface thereof, a type of a target vehicle and a model year thereof (indicated as "model 2003"), a serial number thereof and a name of a manufacturer are listed. In addition, a picture of the vehicle is printed on or attached to the surface of the certificate. In addition, reference numeral 72 is an RFID implanted in the vehicle registration certificate 50. A semiconductor memory is embedded in this RFID 72. In this semiconductor memory, both of a rewrite-inhibited area and a rewritable area exist.

Note that it is assumed that the vehicle registration certificate described above is issued by a manufacturer of the vehicle, a public organization which manages vehicle registration or the like. In addition, this vehicle registration certificate has a size of about a 5.3 cm×8.5 cm credit card, for example, and a material thereof is plastic or the like.

Figure 5:
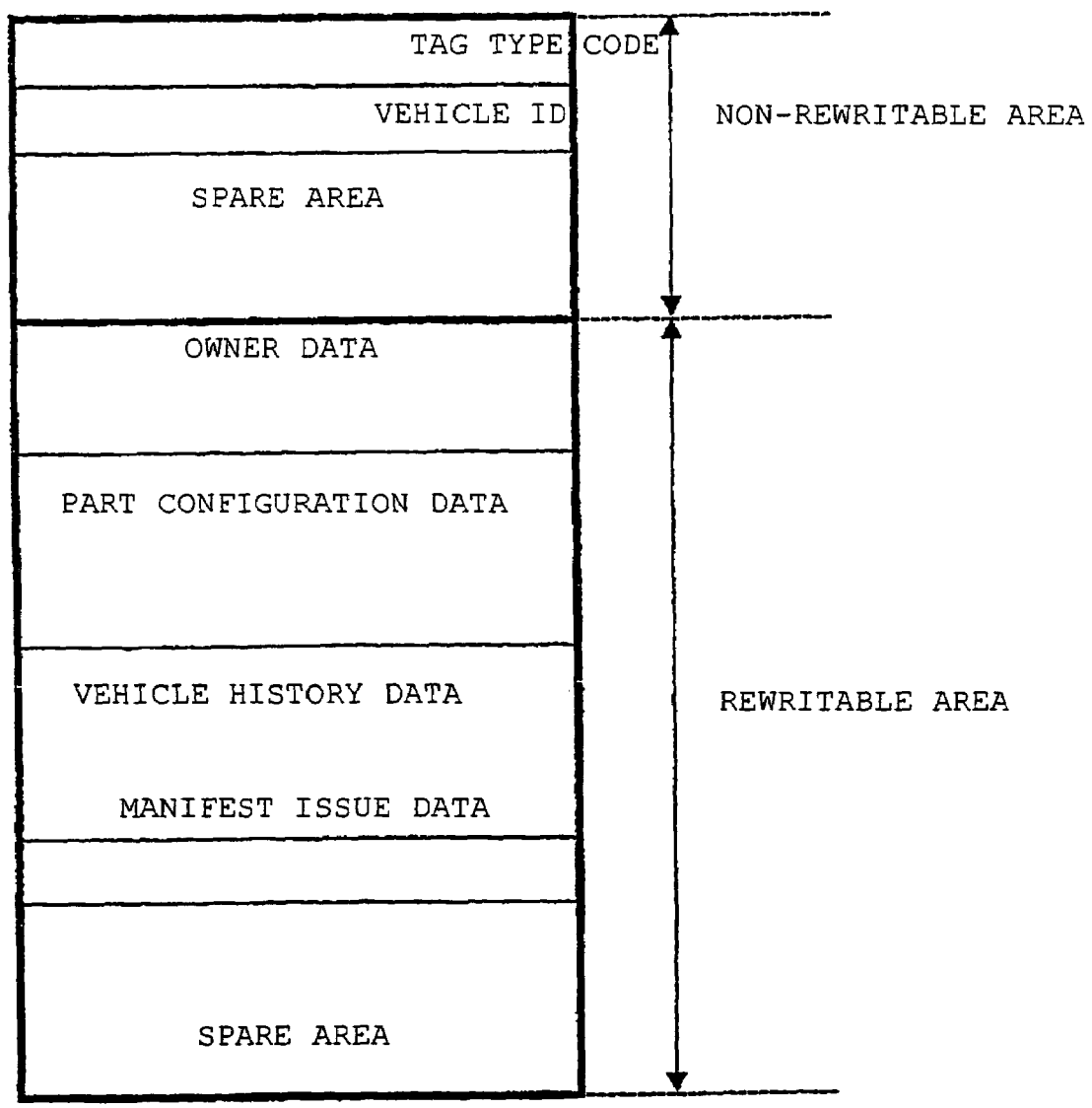
FIG. 5 is a schematic view showing a configuration of data stored in a memory in the RFID according to the first embodiment.

A description will now be given of the RFID provided in the vehicle and information retained by the RFID 72 implanted in the vehicle registration certificate 50. FIG. 5 is a schematic view showing a configuration of data stored in a memory in the RFID described above. As shown in FIG. 5, in the memory, a rewrite-inhibited area and a rewritable area exist. In the rewrite-inhibited area, rewrite is inhibited by using a ROM (read only memory). Alternatively, by a control function included in the RFID, the rewrite-inhibited area is controlled so as not to be rewritten.

In the rewrite-inhibited area, a tag classification code and a vehicle ID are stored and a spare area is further provided. The tag classification code is code information for discriminating whether the RFID is an RFID provided in a vehicle or an RFID provided in a vehicle registration certificate. The vehicle ID is code information for identifying vehicles individually.

In addition, in the rewritable area, owner data, part configuration data, vehicle history data and manifest issuance data are stored and a spare area is further provided. With regard to the owner data, part configuration data, vehicle history data and manifest issuance data, similar information is also retained and managed in the vehicle information database 102, as described later. In the system of the present invention, the vehicle management server 10 and the terminals 20 can communicate with each other through the communication network 80. Thus, according to need, data stored in the vehicle information database 102 (owner data, part configuration data, vehicle history data and manifest issuance data) and data stored in the RFID (owner data, part configuration data, vehicle history data and manifest issuance data) are appropriately updated in synchronization with each other. In addition, since a storage capacity of the RFID is limited, the vehicle information database 102 may have a full set of the respective data described above and the RFID may have only a subset of the respective data.

Referring to FIGS. 6 to 9, a description will now be given of the respective data retained by the vehicle information database 102. Note that data shown in FIGS. 6 to 9 are also partially or entirely retained by the RFID for each vehicle.

FIG. 6 is a schematic view showing a data structure of owner data included in the vehicle information database. As shown in FIG. 6, the owner data includes owner information associated with a vehicle ID. The owner information means information such as a name, a date of birth, an address and the like of an owner.

Figure 7:
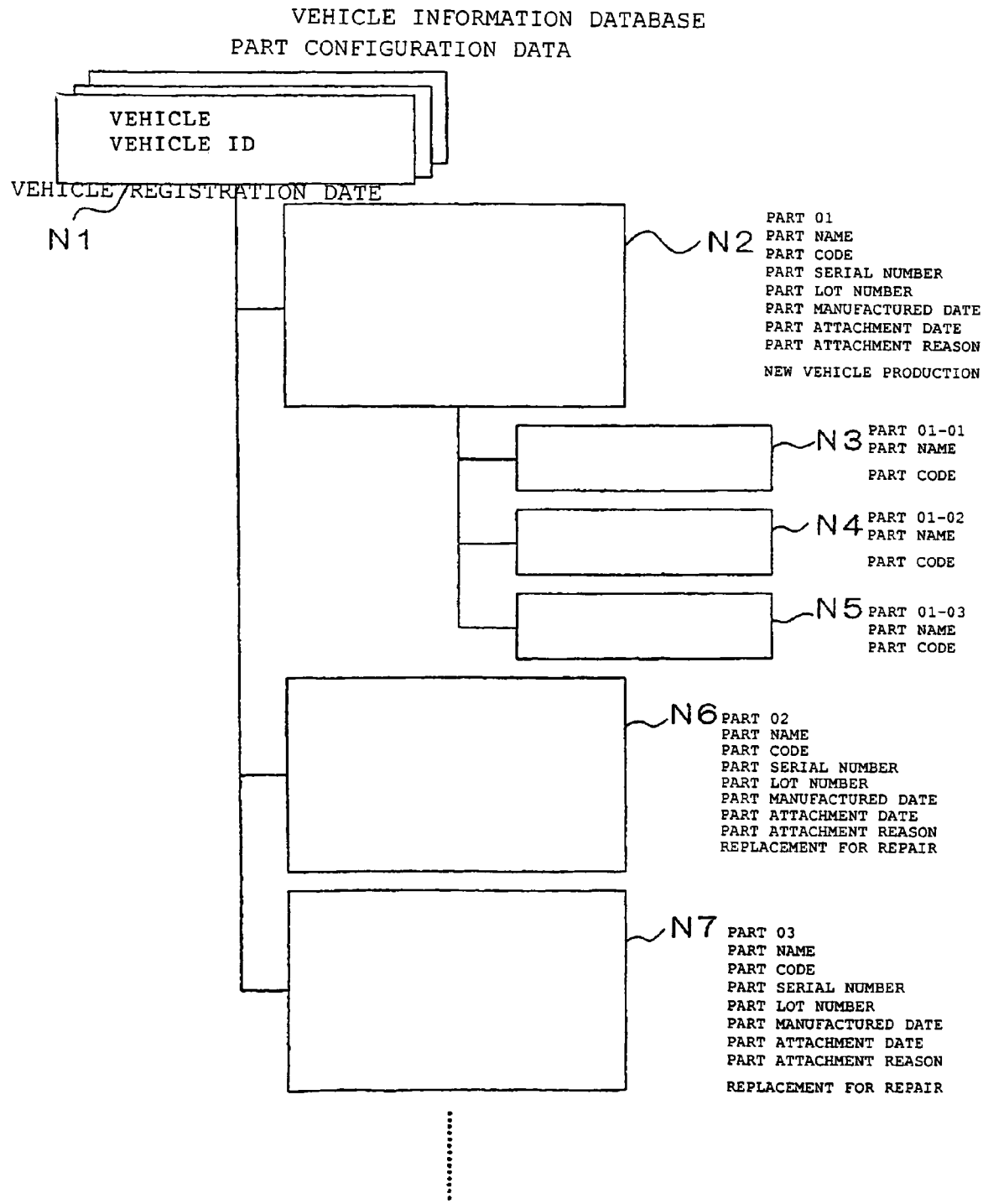
FIG. 7 is a schematic view showing a data structure of part configuration data included in the vehicle information database according to the first embodiment.

FIG. 7 is a schematic view showing a data structure of part configuration data included in the vehicle information database. As shown in the example of FIG. 7, the part configuration data retains information related to a part configuration for each vehicle (for each vehicle ID) as tree structure data. Reference numerals N1 to N7 are nodes in this tree structure. The node N1 corresponds to a vehicle and includes data items such as a vehicle ID and a vehicle registration date. This vehicle includes a part 01, a part 02, a part 03, etc., and information related to these parts are stored in the nodes N2, N6 and N7, respectively. In addition, a part configuration is hierarchical. For example, the part 01 further includes a part 01-01, a part 01-02, a part 01-03, etc., and information related to these parts are stored in the nodes N3 to N5, respectively. Each of the nodes N2 to N7 includes data items such as a part name indicating a name of a part, a part code for identifying a type of a part, a part serial number allocated for each individual part, a part lot number indicating a lot when a part is manufactured, a part manufacturing date indicating a date when a part is manufactured, a part attachment date indicating a date when a part is attached to a vehicle or a date when a part is attached to a high-order part and a part attachment reason indicating a reason for attaching a part (events, for example, "manufacture of a new car", "replacement by repair" and the like).

Note that FIG. 7 exemplifies the case where the number of part hierarchies is two. However, there may be any number of hierarchies.

FIG. 8 is a schematic view showing a data structure of vehicle history data included in the in the vehicle information database. As shown in the example of FIG. 8, the vehicle history data retains history information for each vehicle (for each vehicle ID) and includes at least data items of a date, a history summary, and a detail. Values of the history summary item are, for example, "manufacture of a new car," "owner registration," "owner change," "fueling," "repair," "registration deletion," "manifest issuance" and the like. The history information described above is produced in the terminal 20 every time when respective events occur. The information is written into the RFID provided in the vehicle or the RFID of the vehicle registration certificate according to need and is transmitted to the control unit 101 from the terminal 20. The control unit 101 writes information into the database based on the transmitted information.

It should be noted that when the history summary is "manufacture of a new car," a manufacturer name or a factory name is written as detailed data. When the history summary is "owner registration," an owner name, an owner address and the like are written as detailed data. When the history summary is "fueling," information specifying a gas station, information on a fueling amount and an odometer at the time of fueling and the like are written as detailed data. When the history summary is "repair," information on a repair plant name and repair contents and the like are written as detailed data. When the history summary is "owner change," a name of a new owner, an address of the new owner and the like are written as detailed data.

FIG. 9 schematically shows manifest issuance data included in the vehicle information database. As shown in the example of FIG. 9, the manifest issuance data includes, for each vehicle (for each vehicle ID), data items such as a manifest issued flag, a waste disposal code, discharge enterprise information, collector/transporter information, intermediate disposal enterprise information, final disposal enterprise information, a public key of the discharge enterprise, a public key of the collector/transporter, a public key of the intermediate disposal enterprise, a public key of the final disposal enterprise and the like. The manifest issued flag is information indicating whether or not a manifest is already issued. The waste disposal code is information indicating whether the manifest is issued in a form of paper or in an electronic form. Note that a secret key corresponding to each of the public keys is retained by a computer of each enterprise. In addition, the enterprise at each stage (for example, the intermediate disposal enterprise) may be a plurality of enterprises in accordance with contents of the disposal. In this case, public key information for each enterprise is retained in the manifest issuance data.

Figure 10:
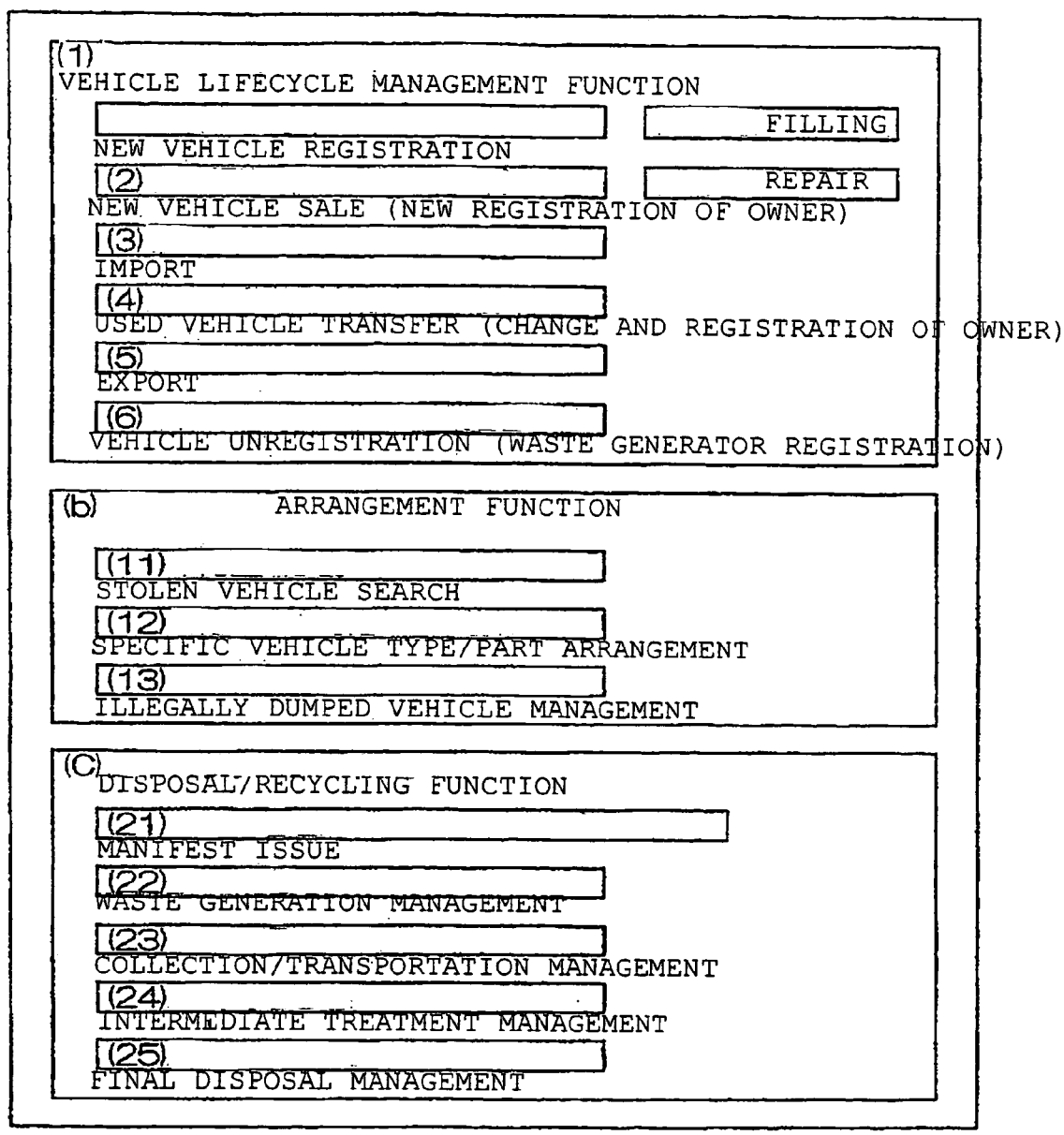
FIG. 10 is a schematic view showing a list of functions included in a control unit of a vehicle information management server according to the first embodiment.

FIG. 10 is a schematic view showing a list of functions included in the control unit 101 of the vehicle information management server 10. As shown in FIG. 10, in this embodiment, the control unit 101 mainly includes (a) a vehicle life cycle management system function, (b) an arrangement system function and (c) a disposal/recycle system function.

To be more specific, the vehicle life cycle management system function includes functions such as (1) new car registration, (2) new car sales (initial registration of owner), (3) import, (4) used car transfer (registration of owner change), (5) export, (6) deletion of vehicle registration information (registration of discharge enterprise), (7) fueling and (8) repair. In addition, the arrangement system function includes functions such as (11) search for a stolen vehicle, (12) arrangement for a specific type of vehicle and specific parts and (13) management of illegally abandoned vehicles. In addition, the disposal/recycle system function includes functions such as (21) manifest issuance, (22) discharge management, (23) collection/transportation management, (24) intermediate disposal management and (25) final disposal management. Hereinafter, general description of each of the functions will be given.

(1) The new car registration function receives a vehicle ID of a new car, part configuration data thereof and the like from the terminal 20 of a car manufacturing facility or the like and registers data of the new car in the vehicle information database 102. In this event, information to be written into an RFID provided in a vehicle, an RFID implanted in a vehicle registration certificate or the like is simultaneously produced.

(2) The new car sales (initial registration of owner) function receives data such as name and address of an owner from the terminal 20 of the dealer, the car sales website server 30 or the like and registers owner data of the vehicle information database 102.

(3) The import function performs processing similar to that of the used car transfer to be described later in the case of import from a country (region) to be managed according to the vehicle management system. In the case of import from other countries (regions), owner data of a new car and part configuration data thereof are registered and past history information is registered as vehicle history data. Functions required for the processing of the import function are received from the terminal 20 of the customs, for example.

(4) The used car transfer (registration of owner change) function receives data such as name and address of an owner after transfer from the terminal 20 of a used car dealer or the like, registers data of a new owner in the vehicle information database 102 and adds vehicle history data.

(5) The export function performs processing similar to that of the used car transfer described above in the case of export to a country (region) to be managed according to the vehicle management system. In the case of export to other countries (regions), owner data is updated or deleted and export records are added as vehicle history data. Functions required for the processing of the export function are received from the terminal 20 of the customs office, for example.

(6) The vehicle registration information deletion (registration of discharge enterprise) function adds information indicating registration deletion as vehicle history data and performs processing of registering a discharge enterprise that is a first agent who contracts for waste disposal in the vehicle information database 102.

(7) The fueling function receives data related to fueling (fueling amount information, odometer information, gas station information and the like) from the terminal 20 of the gas station and performs processing of registering the received data as vehicle history data.

(8) The repair function receives data related to repair from the terminal 20 of the repair plant and registers the received data as vehicle history data. In addition, when replacement of parts and the like are performed in the repair, the part configuration data in the vehicle information database is also updated.

(11) The stolen vehicle search function performs search of a theft by use of a vehicle ID in the case of a stolen vehicle or the like. Information on the search of a theft is transmitted to the terminals 20 of the customs office, the repair plant and the gas station or the like. For example, in the gas station, a vehicle ID is read from an RFID provided in a vehicle at a position where the vehicle stops for fueling and the vehicle ID read from the RFID of the vehicle can be compared to a vehicle ID of the search of theft information. In addition, when both IDs coincide with each other as a result of the comparison, the fueling may be automatically cut off and information on a location of the gas station may be notified to the vehicle information management server. Thus, it is made possible to relatively easily determine the whereabouts of the stolen vehicle.

(12) In the case where life of a part of a specific lot is about to end or the like, for example, the specific vehicle-type/specific-part arrangement function specifies a vehicle having the part by searching through the part configuration data in the vehicle information database 102 and obtains owner data of the vehicle. Thus, it is made possible to send guidance of part replacement and the like to the owner. In addition, in a part of the vehicle history data, a history of receiving automobile inspections, a history of replacing parts such as tires, a history of performing maintenance and inspections and the like are included. Accordingly, based on the vehicle history data described above, when a predetermined period of time has passed since the last automobile inspection, part replacement, inspection or the like, it is possible to send guidance of the next automobile inspection, part replacement, inspection or the like. The guidance described above may be mailed to the address of the owner or may be sent by e-mail to an e-mail address retained as the owner data. In addition, besides the case of the life of the part, in a part having built-in control means by software, for example, guidance may be sent to the owner for function addition and the like of the software.

(13) The illegally abandoned vehicle management function outputs information related to an illegally abandoned vehicle. For example, when an illegally abandoned vehicle is found, a vehicle ID is read from an RFID provided in the vehicle by use of a handheld terminal device or the like (portable terminal device) at the scene of abandonment. Thereafter, based on this vehicle ID, the control unit 101 reads vehicle history data and owner data of the relevant vehicle from the vehicle information database 102. In addition, if the registration of the vehicle has already been deleted and subjected to waste disposal, the disposal/recycle system function to be described later tracks situations of waste disposal based on the data written in the vehicle information database 102.

Figure 11:
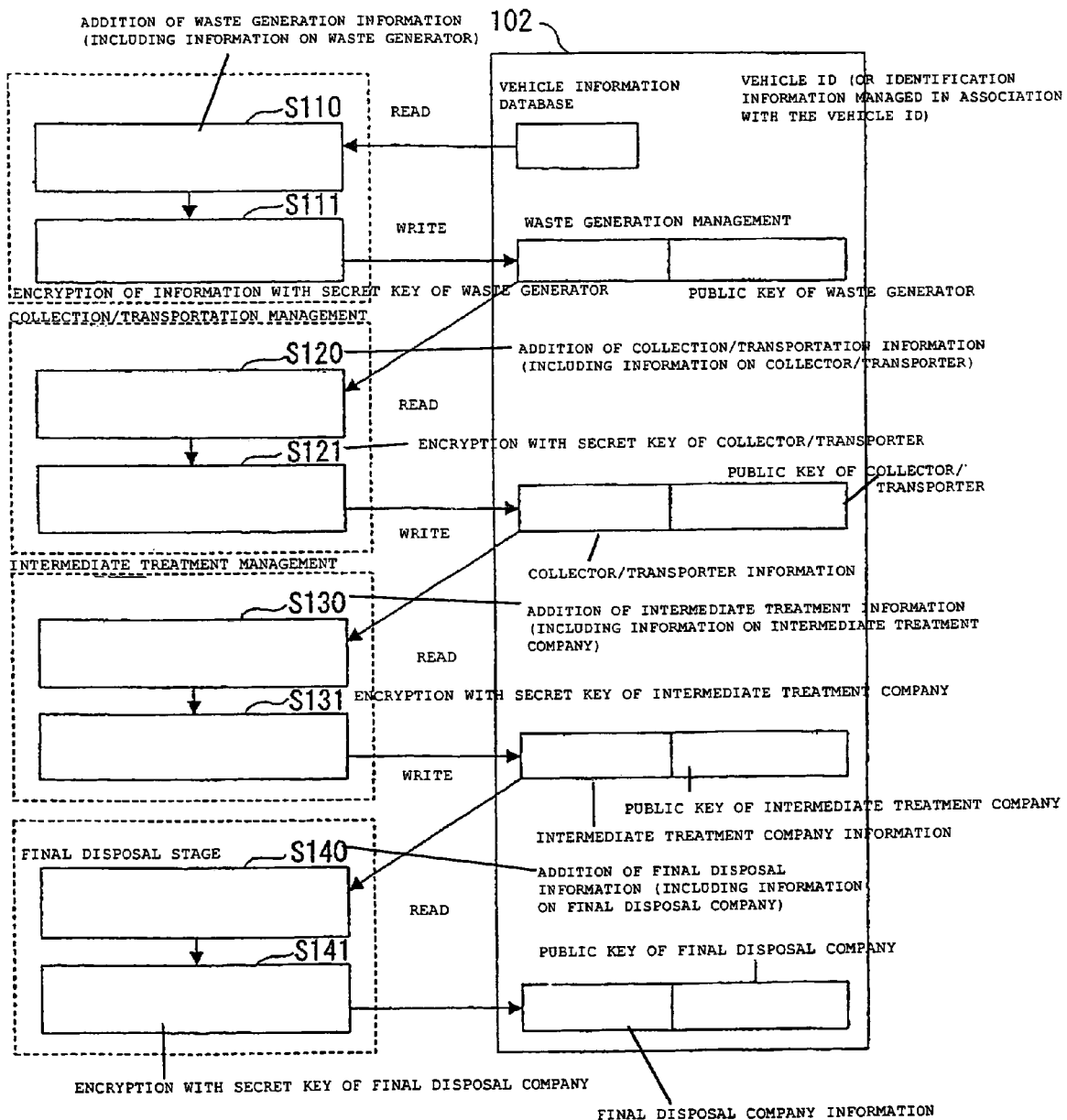
FIG. 11 is a schematic diagram showing processing and a data flow in a disposal/recycle system function according to the first embodiment.

The disposal/recycle system function will now be described. FIG. 11 is a schematic view showing processing and a data flow in the disposal/recycle system function. In FIG. 11, discharge management, collection/transportation management, intermediate disposal management and final disposal management are functions included in the control unit 101. Note that the processing shown in FIG. 11 is based on the premise that an electronic manifest is already issued.

Specifically, when the processing of the vehicle registration information deletion is performed, processing of manifest issuance is performed in conjunction therewith and a manifest (manifest data) as electronic data is recorded in the vehicle information database 102. A vehicle ID is included in this manifest data and the manifest data and other data in the vehicle information database are associated with each other by use of this vehicle ID. It should be noted that instead of retaining the manifest data in the vehicle information database 102, the manifest data may be recorded and retained in another storage region in the vehicle information management server 10 or in a recording medium (not shown) such as a magnetic disk in another computer.

The above-described functions will be described below along the flow of FIG. 11. First, the discharge management function included in the control unit 101 reads a vehicle ID of a vehicle as a target of disposal from the vehicle information database 102 and adds discharge information (including information related to the discharge enterprise) (Step S110). Thereafter, this vehicle ID and information including the discharge information are transmitted to the terminal 20 of the discharge enterprise through the communication network 80 and encrypting thereof is requested. This information is encrypted at the discharge enterprise side by use of a secret key of the discharge enterprise and returned to the discharge management function of the control unit 101. The discharge management function writes the returned information after being encrypted in the vehicle information database 102 as discharge enterprise information and also writes a public key of the discharge enterprise in the vehicle information database 102 (Step S111).

Next, the collection/transportation management function included in the control unit 101 reads the discharge enterprise information from the vehicle information database 102 and adds collection/transportation information (including information related to the collector/transporter) (Step S120). Thereafter, this added information is transmitted to the terminal 20 of the collector/transporter through the communication network 80 and encrypting thereof is requested. This information is encrypted at the collector/transporter side by use of a secret key of the collector/transporter and returned to the collection/transportation management function of the control unit 101. The collection/transportation management function writes the returned information after being encrypted in the vehicle information database 102 as collector/transporter information and also writes a public key of the collector/transporter in the vehicle information database 102 (Step S121).

The intermediate disposal management function included in the control unit 101 then reads the collector/transporter information from the vehicle information database 102 and adds intermediate disposal information (including information related to the intermediate disposal enterprise) (Step S130). Thereafter, this added information is transmitted to the terminal 20 of the intermediate disposal enterprise through the communication network 80 and encrypting thereof is requested. This information is encrypted at the intermediate disposal enterprise side by use of a secret key of the intermediate disposal enterprise and returned to the intermediate disposal management function of the control unit 101. The intermediate disposal management function writes the returned information after being encrypted in the vehicle information database 102 as intermediate disposal enterprise information and also writes a public key of the intermediate disposal enterprise in the vehicle information database 102 (Step S131).

The final disposal management function included in the control unit 101 then reads the intermediate disposal enterprise information from the vehicle information database 102 and adds final disposal information (including information related to the final disposal enterprise) (Step S140). Thereafter, this added information is transmitted to the terminal 20 of the final disposal enterprise through the communication network 80 and encrypting thereof is requested. This information is encrypted at the final disposal enterprise side by use of a secret key of the final disposal enterprise and returned to the final disposal management function of the control unit 101. The final disposal management function writes the returned information after being encrypted in the vehicle information database 102 as final disposal enterprise information and also writes a public key of the final disposal enterprise in the vehicle information database 102 (Step S141).

As described above, the processing from the Step S110 to S141 is performed in accordance with the respective stages of the waste disposal and information of waste is managed. Thus, information related to situations of waste disposal can be managed in an integrated fashion. In addition, this information is encrypted by use of the secret keys of the respective enterprises. Thus, by decrypting the information by use of corresponding public keys, the information can be surely ensured to be information added by the enterprises. In addition, information sufficient to accurately track the process of the waste disposal can be retained in the vehicle information database. In addition, the information related to the waste disposal is associated with the vehicle ID of the vehicle and the vehicle ID corresponds to the vehicle ID written in the RFID provided in the vehicle registration certificate or in the vehicle itself. Thus, it is possible to surely identify an individual vehicle, which has become a target of waste disposal.

It should be noted that in the example of FIG. 11, it is assumed that the processing is performed in order from the discharge enterprise to the collector/transporter to the intermediate disposal enterprise and to the final disposal enterprise. However, the processing is not always necessary to be performed in this order. Alternatively, the enterprise information of the disposal/recycle system may be added while being encrypted in stages. For example, a single enterprise may collectively perform both of the collection/transportation and the intermediate disposal, the intermediate disposal may be further divided into a plurality of stages by a plurality of enterprises or the disposal enterprises may be divided according to materials included in waste and the like.

The vehicle information management server 10, the terminals 20, the portable terminal 21, the car sales website server 30 and the like, all of which are described above, include a computer system therein, respectively. Each of the processes of the processing of the vehicle information management described above is stored in a computer-readable recording medium in a form of a program. Accordingly, this program is read and executed by a computer to perform the foregoing processing. Here, the computer-readable recording medium means a magnetic disk, a magneto-optical disk, a CD-ROM, a DVD-ROM, a semiconductor memory or the like. In addition, this computer program may be delivered to the computer through a communication line and a computer which has received this delivery may execute the program.

The embodiment of the present invention has been described above in detail with reference to the drawings. However, a concrete configuration is not limited to the embodiment described above but includes designs and the like without departing from the spirit of the present invention.

As described above, according to the present invention, based on information read from a tag fixed to an article, an individual article can be identified. In addition, since registration information or history information related to the individual article is outputted, the outputted information can be confirmed by a person. Thus, the information can be utilized in various stages from production of the article to disposal thereof and convenience is improved.

In addition, according to the present invention, article information storage means is provided outside of the tag. Thus, a larger amount of article information can be stored.

In addition, according to the present invention, the terminal device provided in each of the bases includes the tag information read means and the comparison means can compare identification information based on information sent from the terminal device to identification information previously stored in the search target identification information storage means. Thus, it is made possible to know the whereabouts of a searched vehicle such as a stolen car.

In addition, according to the present invention, by searching through the part configuration information, an article having a specific part can be specified, and information on an owner of the article can be obtained. Thus, guidance of part replacement and the like can be completely and surely sent to the owner.

In addition, according to the present invention, the enterprise information in the respective stages of the waste disposal is stored while being associated with the identification information. Thus, the processes of the waste disposal can be strictly managed. In addition, when an article is illegally dumped, for example, the article can be identified and an owner of the article or a waste disposer can be specified, which leads to prevention of illegal dumping of articles (for example, cars, motorcycles and the like).

Figure 12:
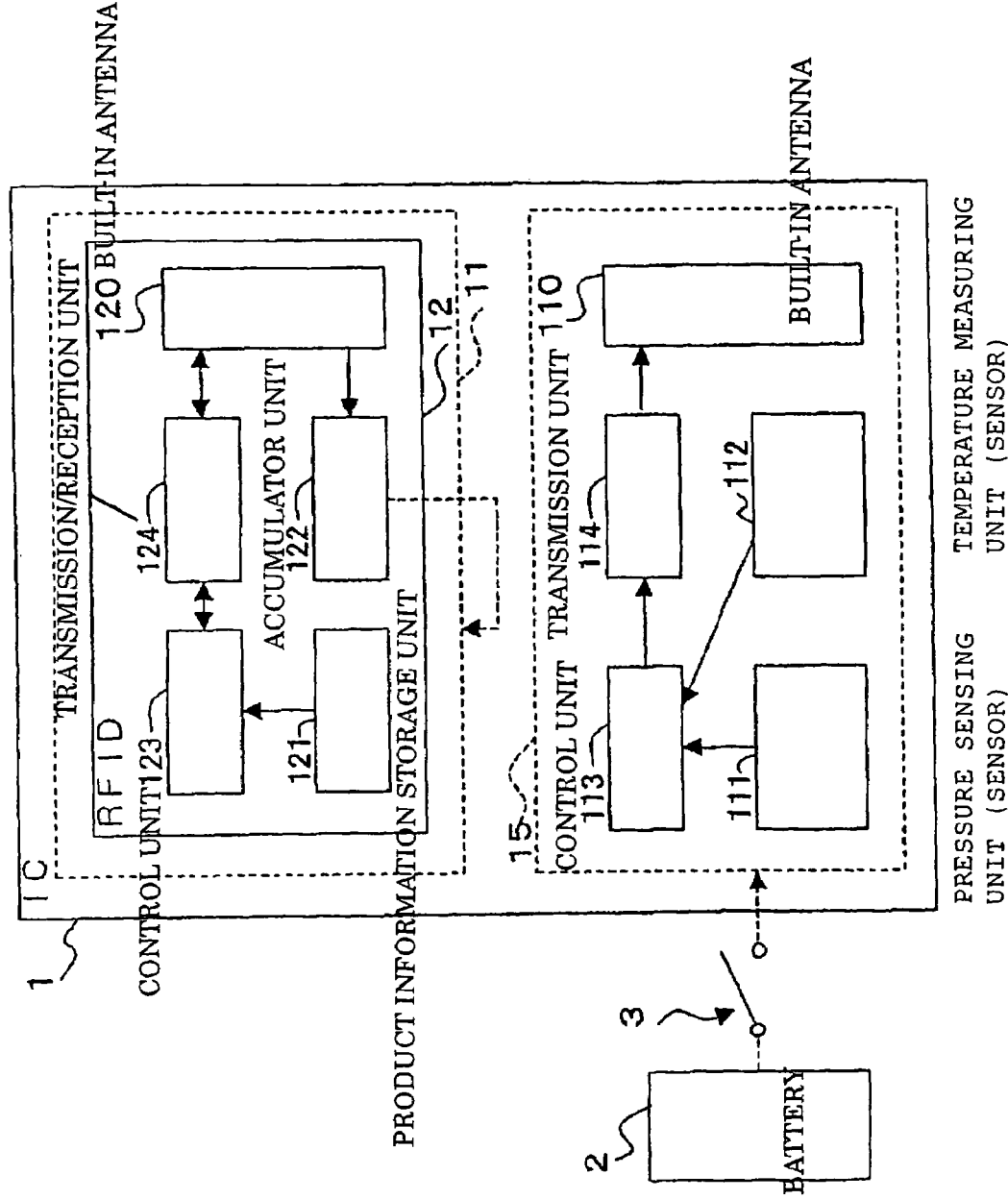
FIG. 12 is a block diagram showing the functional configuration of an IC according to a second embodiment of the present invention.

FIG. 12 is a block diagram showing the functional configuration of an IC according to the second embodiment. In FIG. 12, reference numeral 1 denotes the IC, and reference numeral 2 denotes a battery for supplying power to the IC 1. As the battery 2, for example, a lithium battery or the like which is excellent in durability is used. Reference numeral 3 denotes a switch for controlling the connection/disconnection between the IC 1 and the battery 2.

Inside the IC 1, circuits 15 and 11 are contained. Out of these two, only the circuit 15 is supplied with power from the battery 2. The circuit 11 contains a circuit of an RFID 12.

This RFID 12 includes a built-in antenna 120, a product information storage unit 121 (storage means), an accumulator unit 122, a control unit 123, and a transmission/reception unit 124. The built-in antenna 120 is an antenna for receiving an electromagnetic wave signal from the outside and transmitting an electromagnetic wave signal to the outside, and realized as, for example, a coil-shaped circuit pattern made of conductive material. The product information storage unit 121 is a memory for storing product information including product identification information allowing the present product individual to be identified, and realized by a semiconductor memory or the like. The accumulator unit 122 is a circuit for supplying power to the entire circuit 11, and includes a capacitor, which temporarily accumulates power generated by using electromagnetic waves received by the built-in antenna 120, or the like. The accumulator unit 122 is designed by use of a time constant which enables the necessary power supply to be maintained during a series of operations by the RFID 12 starting with the reception of a read signal and ending with the transmission of information to the outside according to procedures described later. The control unit 123 controls a series of operations starting with the reading-out of required information from the product information storage unit and ending with the transmission of the required information to the outside when a read signal is received from the outside. The transmission/reception unit 124 receives a read signal of electromagnetic waves from the outside to communicate the read signal to the control unit 123, and transmits a signal of electromagnetic waves to the outside in accordance with instructions from the control unit 123.

Information stored in the product information storage unit 121 includes product identification information, price information, shop information, the minimum value for appropriate pressure, the maximum value for appropriate pressure, the minimum value for appropriate temperature, and the maximum value for appropriate temperature. The product identification information is unique code information for identifying the present IC individual. The price information is information on a price set in a shop or the like, and is read out by a point-of-sales (POS) system of the shop when a user purchases a product having the present IC incorporated therein. The shop information is code information allowing a shop, where the product is sold, to be identified. The minimum value for appropriate pressure and the maximum value for appropriate pressure indicate a range of appropriate values for the pressure sensed by the present IC. Storing these values makes it possible to send an alarm signal in the case where a sensed pressure value is not in this range. The minimum value for appropriate temperature and the maximum value for appropriate temperature indicate a range of appropriate values for the temperature sensed by the present IC. Storing these values makes it possible to send an alarm signal in the case where a sensed temperature value is not in this range.

Incidentally, the product identification information is held on a read-only memory (ROM) or a write-once memory. In addition, other than the information cited here, other product information may be further stored in the product information storage unit 121.

The circuit 15 includes a built-in antenna 150, a pressure sensing unit 111 (sensor, pressure sensor), a temperature measuring unit 112 (sensor, temperature sensor), a control unit 113, and a transmission unit 114.

The pressure sensing unit 111 is constituted using a semiconductor pressure sensor, and senses pressure to output a signal in accordance with the value of the pressure. To cite an example, the pressure sensing range is 0 to 500 kPa, and the pressure sensing accuracy is ±2%. A pressure sensing unit having such a pressure sensing range and a pressure sensing accuracy is suitable for, for example, measuring the air pressure in a tire.

The temperature measuring unit 112 measures temperature and outputs a signal in accordance with the value of the temperature. To cite an example, the temperature measuring range is 233 K to 393 K (minus 40 degrees to plus 120 degrees Celsius), and the temperature measuring accuracy is ±8 K.

The control unit 113 receives a pressure value signal from the pressure sensing unit 111, and receives a temperature value signal from the temperature measuring unit 112. In addition, the control unit 113 stores identification information inside, which allows the present IC individual to be identified. The control unit 113 outputs a signal indicating pressure value information (sensor information), temperature value information (sensor information), and identification information in accordance with predetermined timing.

The transmission unit 114 transmits electromagnetic waves, modulated based on the above-described signal outputted from the control unit 113, to the outside. To cite an example, frequency modulation (FM) is used as a modulation technique, and an appropriate frequency between several hundred MHz and several ten GHz is used as a transmission frequency.

The built-in antenna 110 is used for transmitting the signal from the transmission unit 114, to the outside.

Figure 13A:
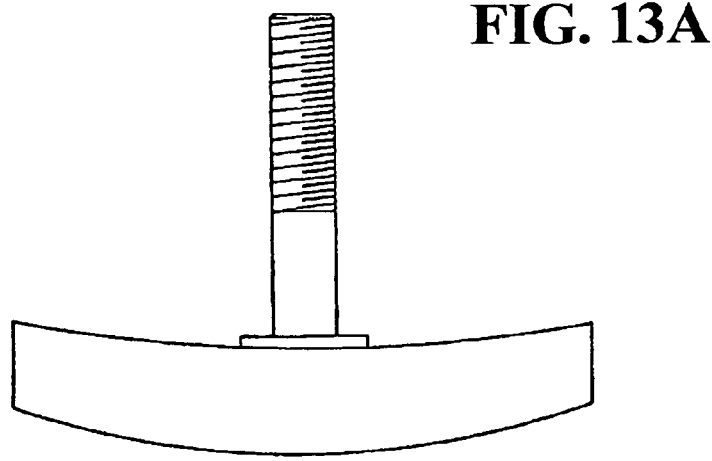
FIGS. 13A and 13B are a schematic views showing the appearance and the like of a tire air pressure monitoring device in which the IC according to the second embodiment is used.
Figure 13B:
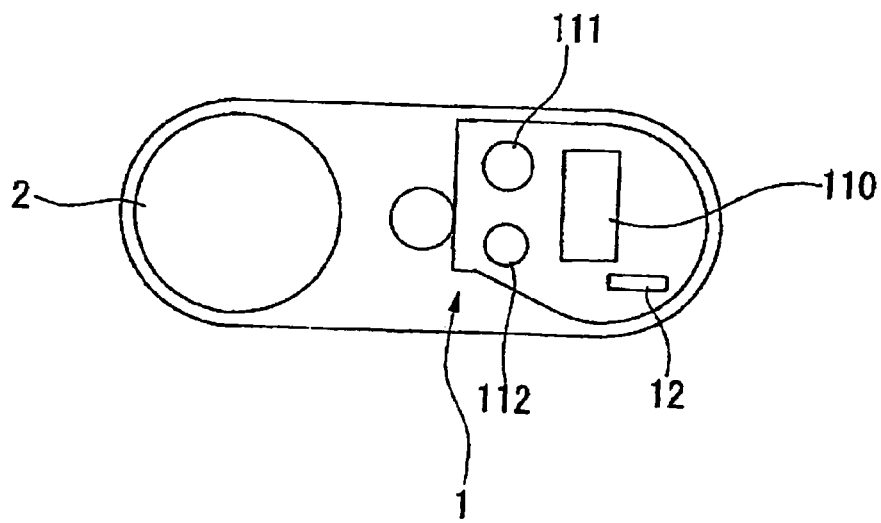

The placement of each unit in the above-described IC 1 will now be described. FIGS. 13A and 13B are schematic views showing the appearance and the like of a tire air pressure monitoring device in which the IC according to the present embodiment is used. FIG. 13A shows the schematic viewed from a side thereof, and FIG. 13B shows the schematic viewed from the bottom thereof. Respective reference numerals shown in FIGS. 13A and 13B are the same as those shown in FIG. 12. As shown in these drawings, the battery 2 is placed in the vicinity of the IC 1. Inside the IC 1, the built-in antenna 110, the pressure sensing unit 111, the temperature measuring unit 112, the RFID 12, and the like are placed as shown in these drawings. Note that elements and the like included in the IC 1 are contained in a single case.

As described previously, the circuit 15 is supplied with power from the battery 2. Accordingly, the circuit 15 performs the operations of pressure sensing, temperature measuring, and transmission to the outside when the switch 3 is in a connected state, and is stopped when the switch 3 is in a disconnected state. On the other hand, the circuit 11 is supplied with power from the accumulator unit 122 therein. Accordingly, the circuit 11 operates regardless of the connection/disconnection of the switch 3 as long as sufficient power (voltage, current) is supplied from the accumulator unit 122.

The operations of respective units of the IC 1 will now be described.

Figure 14:
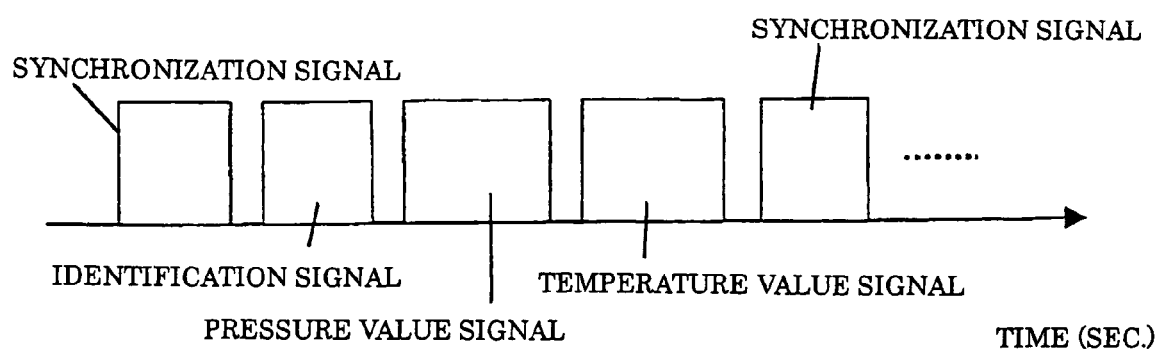
FIG. 14 is timing chart showing contents of a signal transmitted by a circuit (15) in the second embodiment.

FIG. 14 is a timing chart showing contents of signals transmitted by the circuit 15. In the circuit 15, the control unit 113 receives signals having values representing respective measurement results from the pressure sensing unit 111 and the temperature measuring unit 112 at predetermined sufficiently short intervals. Furthermore, the control unit 113 sequentially outputs a synchronization signal, an identification signal, a pressure value signal, and a temperature value signal, and electromagnetic waves modulated by these signals are transmitted to the outside by the transmission unit 114. The synchronization signal is a signal having a predetermined pattern used for the synchronization with a receiver side. The identification signal is a signal generated so as to correspond to identification information (information for identifying the IC individual) by reading out the identification information stored in the control unit 113. The pressure value signal is a signal corresponding to a numeric value (pressure value) received from the pressure sensing unit 111. The temperature value signal is a signal corresponding to a numeric value (temperature value) received from the temperature measuring unit 112. After the temperature value signal has been outputted, then returning to the beginning, output is performed in order of the synchronization signal, the identification signal, the pressure value signal, and the temperature value signal. This is repeated as long as the supply of power from the battery 2 continues.

Figure 15A:
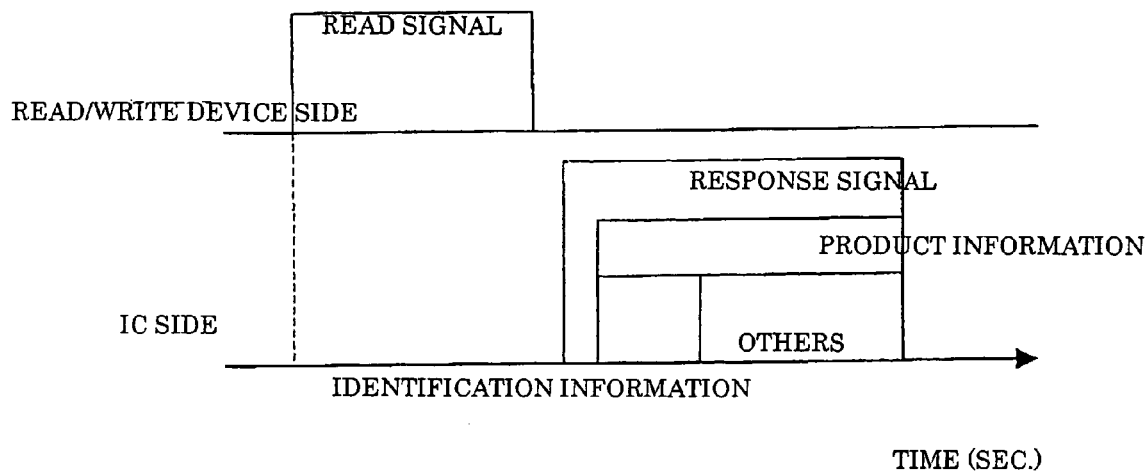
FIGS. 15A and 15B are timing charts showing contents of signals transmitted/received by an RFID (12) in the second embodiment.
Figure 15B:
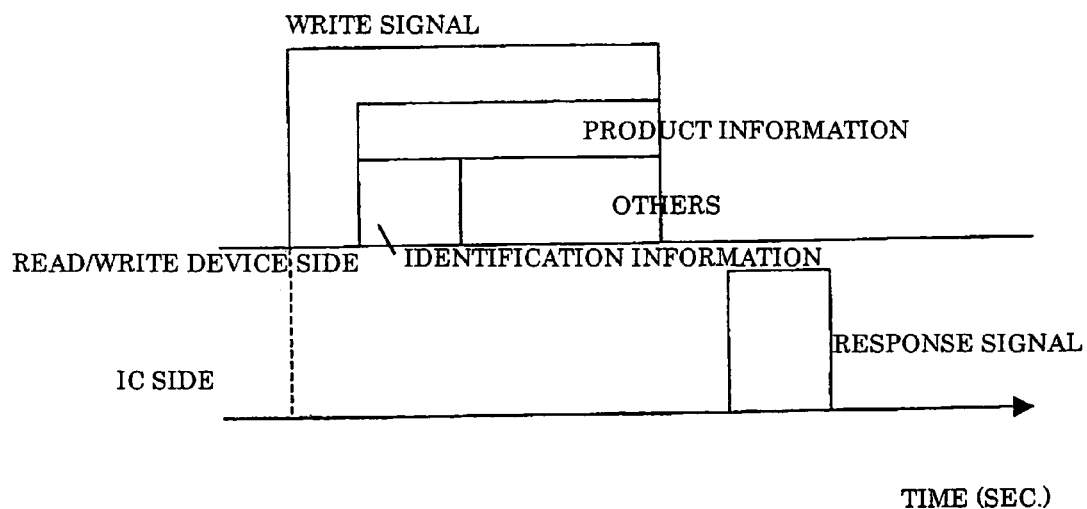

FIGS. 15A and 15B are timing charts showing contents of signals transmitted/received by the RFID 12. FIG. 15A corresponds to operations on the IC side (RFID side) when a read signal is received from the outside (a read/write device side where information on the present IC is read/written), and FIG. 15B corresponds to operations on the IC side when a write signal is received from the outside.

In FIG. 15A, first, when a read signal is received from the read/write device side, the power generated in the RFID 12 is temporarily accumulated in the accumulator unit 122. Upon receiving the supply of power from the accumulator unit 122, the control unit 123 and the like start operating. The control unit 123 first recognizes that the signal received is a read signal, and reads product information from the product information storage unit 121. Then, a response signal containing the product information read is outputted. The response signal is transmitted as an electromagnetic wave signal to the outside by the transmission/reception unit 124. The transmitted electromagnetic wave signal is received by the read/write device. Incidentally, the product information contained in the response signal includes identification information and others in FIG. 15A. However, for example, the response signal may contain only the identification information.

In FIG. 15B, first, when a write signal is received from the read/write device side, the control unit 123 and the like start operating upon receiving the supply of power from the accumulator unit 122 similarly to the above. The control unit 123 recognizes that the received signal is a write signal, and reads product identification information from the product information storage unit 121. Then, the product identification information read and the identification information received from the outside are compared. If the two pieces of identification information do not match, writing to the product information storage unit 121 is not performed, and a signal representing "failure" is outputted as a response signal. If the two pieces of identification information match in the above comparison, the information stored in the product information storage unit 121 is updated with the product information received. That is, upon receiving product information from the outside, the control unit 123 writes the product information to the product information storage unit 121.

Such update of product information is performed, for example, in the case where appropriate values are set depending on types of tires in which the tire air pressure monitoring device is provided (update of the minimum value for appropriate pressure, the maximum value for appropriate pressure, the minimum value for appropriate temperature, and the maximum value for appropriate temperature). Alternatively, for example, such update is performed in the case where prices are reduced for a sale or the like in a shop (update of price information).

The registration of identification information in the tire air pressure monitoring device will now be described. The device which has been shown in FIGS. 13A and 13B and in which the IC according to the present embodiment is incorporated is provided in a tire at the manufacturing stage of the tire. On the other hand, radio signals (including a pressure value signal and a temperature value signal) transmitted from the transmission unit 114 are received by a receiver provided in a main car body of an automobile, a motorcycle, or the like. Therefore, in order that this receiver correctly operates based on the radio signals from its own tire, the identification information of a device provided in a tire needs to be registered on the receiver side at the manufacturing stage of a new car or at the time of exchanging tires.

In the case where the IC of the present embodiment is used, the above registration can be performed by two methods. The first method is a method in which an identification signal transmitted from the circuit 15 is received and registered on the receiver side. The second method is a method in which the registration on the receiver side is performed using the identification information (product identification information) included in product information transmitted from the RFID 12. In order to use the second method, the identification information represented by the identification signal transmitted from the circuit 15 and the identification information transmitted from the RFID 12 need to be the same or correlated with each other. Here, "being correlated with each other" means, for example, that the key portions of the two pieces of information are the same, that whether or not the two pieces of information are correlated with each other can be judged by performing a calculation using the two pieces of information as parameters, or the like.

Generally, in a tire air pressure monitoring system, the transmission of a signal is stopped (the switch 3 is disconnected) in order to prevent a battery from being consumed during transportation and storage in the distribution process. However, since the above-described second method has been enabled, the registration to a receiver can be performed by reading product identification information from the RFID. Therefore, convenience is improved, such as the need for a device start-up operation on the transmitter side for registration is eliminated.

The aforementioned control units 113 and 123 are realized by logic circuits of combinatory logic and sequential circuits. As one form thereof, the control units 113 and 123 may be realized by use of a computer. In this case, the aforementioned process of processing by each control unit is stored in the form of a program on a computer-readable recording medium, and the computer reads out and executes this program, thereby performing the above-described processing. Here, the computer-readable recording medium means a magnetic disk, a magneto-optical disk, a CD-ROM, a DVD-ROM, a semiconductor memory, or the like. In addition, the following may be adopted: this computer program is delivered to a computer using a communication line, and the computer which has received the delivery executes the program.

Although embodiments of the present invention have been described in detail with reference to the drawings, a concrete configuration is not limited to these embodiments. The present invention covers design and the like without departing from the scope of the present invention.

For example, in FIG. 12, the built-in antennas 110 and 120 are individually provided. However, these may be provided as one common built-in antenna.

In addition, for example, in FIG. 12, the transmission unit 114 and the transmission/reception unit 124 are individually provided. However, these may be provided as a common transmission/reception unit. In this case, switching means for controlling whether this common transmission/reception unit is supplied with power from the battery 2 or the accumulator unit 122 is also provided.

Further, for example, in FIG. 12, product identification information is stored in the control unit 113, and the control unit 113 outputs an identification signal by reading the product identification information. However, instead, the control unit 113 may read product identification information from the product information storage unit 121. Also in this case, switching means for switching the supply of power between the two systems is provided as needed. Such configuration makes it possible to assure that identification information transmitted from the circuit 15 and identification information transmitted from the RFID 12 are the same.

In addition, the IC according to the present embodiment can be used not only for a tire air pressure monitoring system but also for other products.

As described above, according to the present invention, it is enabled that the state of a product is transmitted to the outside by providing a sensor inside an IC having means for storing product information which includes product identification information and transmitting this product information to the outside by reading out the product information. For example, the life (exchange timing), maintenance timing, or the like of a component of an automobile, a motorcycle, or the like can be detected.

In addition, according to the present invention, it becomes possible to update product information (such as setting information of a product, distribution-related information on a price, a shop, and the like,) by writing product information to storage means when the IC receives the product information from the outside.

Further, using a pressure sensor as the sensor enables the air pressure of a tire, the pressure of brake oil, or the like to be detected.

In addition, using a temperature sensor as the sensor enables the temperature of (the rubber portion of) a tire, the temperature of engine coolant, or the like to be detected.

Furthermore, according to the present invention, a component can be miniaturized and manufactured inexpensively because of the configuration in which the storage means, the control means, and the sensor provided in the IC are contained in a single case.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An article management system comprising:
   a tag, said tag being mountable to an article from production of the article to disposal thereof, said tag including identification information that identifies a particular article;
   tag information read means for reading information from the tag;
   identification means for identifying an individual article based on the identification information read from the tag;
   article information storage means for storing at least one of registration information and history information of the article while associating the information with the identification information of the individual article;
   information output means for reading at least one of the registration information related to the individual article and the history information related thereto from the article information storage means and outputting the read information, based on an identification result obtained by the identification means;
   manifest issuance means for issuing a manifest in association with identification information for identifying the individual article; and
   waste disposal information storage means for storing information of enterprises in respective stages of waste disposal in association with the identification information.

2. The article management system according to claim 1, wherein the article information storage means is provided outside of the tag.

3. The article management system according to claim 2, wherein the article is transportation equipment.

4. The article management system according to claim 3, wherein the tag information read means is included in a terminal device, and the article management system further comprises:
- search target identification information storage means for storing identification information of transportation equipment to be searched; and
- comparison means for comparing an identification result obtained by identifying an individual transportation equipment by the identification means to identification information stored in the search target identification information storage means, based on information sent from the terminal device.

5. The article management system according to claim 1, wherein the article is transportation equipment.

6. The article management system according to claim 5, wherein the tag information read means is included in a terminal device, and the article management system further comprises:
- search target identification information storage means for storing identification information of transportation equipment to be searched; and
- comparison means for comparing an identification result obtained by identifying an individual transportation equipment by the identification means to identification information stored in the search target identification information storage means, based on information sent from the terminal device.

7. The article management system according to claim 1, further comprising:
- part configuration information storage means for storing part configuration information indicating a part configuration for each individual article while associating the part configuration information with identification information of the article;
- owner information storage means for storing owner information indicating an owner for each individual article while associating the owner information with the identification information of the article; and
- owner information extraction means for listing article identification information of an article including a specific part by referring to the part configuration information storage means and for extracting and outputting the owner information stored in the owner information storage means while associating the owner information with the listed article identification information, respectively.

8. The article management system according to claim 1, wherein
- a portable terminal device for reading information from the tag fixed to a dumped article includes the tag information read means,
- the identification means identifies the dumped individual article based on information sent from the portable terminal device and
- the system further comprises dumped article information output means for outputting information read by referring to at least any one of the article information storage means and the waste disposal information storage means based on an identification result obtained by the identification means.

9. An article management system comprising:
- a tag, said tag being mountable to a vehicle from production of the vehicle to disposal thereof, said tag including identification information that identifies a particular vehicle;
- tag information read means for reading information from the tag;
- identification means for identifying an individual article based on the identification information read from the tag;
- article information storage means for storing at least one of registration information and history information of the article while associating the information with the identification information of the individual article, the history information including maintenance or inspection information; and
- information output means for reading at least one of the registration information related to the individual article and the history information related thereto from the article information storage means and outputting the read information, based on an identification result obtained by the identification means.

* * * * *